US007102893B1

(12) United States Patent
MacArthur et al.

(10) Patent No.: US 7,102,893 B1
(45) Date of Patent: Sep. 5, 2006

(54) METHODS AND APPARATUS FOR FORMING A COHESIVE BACKPLANE INTERCONNECT SYSTEM

(75) Inventors: Stephen D. MacArthur, Northboro, MA (US); Rudy Bauer, Franklin, MA (US); William Frederick Baxter, III, Holliston, MA (US); Paul C. Wilson, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 339 days.

(21) Appl. No.: 10/673,829

(22) Filed: Sep. 29, 2003

(51) Int. Cl.
*H01R 12/16* (2006.01)

(52) U.S. Cl. .......................... 361/788; 385/88; 385/14; 385/53

(58) Field of Classification Search ................ 361/788, 361/803; 385/88, 14, 53
See application file for complete search history.

(56) References Cited

U.S. PATENT DOCUMENTS

| | | | |
|---|---|---|---|
| 6,600,853 B1 * | 7/2003 | Wickman et al. ............. | 385/24 |
| 6,623,177 B1 | 9/2003 | Chilton ......................... | 385/88 |
| 6,661,940 B1 * | 12/2003 | Kim ............................. | 385/15 |
| 6,694,068 B1 * | 2/2004 | Parker .......................... | 385/14 |
| 6,762,362 B1 | 7/2004 | Cavanaugh et al. ........ | 174/68.2 |
| 2003/0210869 A1 * | 11/2003 | Doorn .......................... | 385/53 |

* cited by examiner

*Primary Examiner*—Hung V. Ngo
(74) *Attorney, Agent, or Firm*—BainwoodHuang (57) ABSTRACT

An assembly couples first and second backplanes together. The first backplane is configured to carry first electrical backplane signals among a first set of circuit boards. The second backplane is configured to carry second electrical backplane signals among a second set of circuit boards. The assembly includes a first switch configured to convey at least some of the first electrical backplane signals between circuit boards of the first set of circuit boards. The assembly further includes a second switch configured to convey at least some of the second electrical backplane signals between circuit boards of the second set of circuit boards. The assembly further includes a fiber optic cable joining the first and second switches together. The first and second switches are configured to exchange fiber optic signals through the fiber optic cable thus forming a cohesive backplane interconnect system between the first and second sets of circuit boards.

16 Claims, 11 Drawing Sheets

METHODS AND APPARATUS FOR FORMING A COHESIVE BACKPLANE INTERCONNECT SYSTEM

BACKGROUND

A typical data storage system stores and retrieves data on behalf of one or more external hosts. One conventional data storage system includes multiple front-end director circuits, multiple back-end director circuits, cache memory, and disk drives. The director circuits (or simply directors) reside on circuit boards, e.g., four directors per director circuit board. Similarly, the cache memory resides on circuit boards, e.g., a fixed number of megabytes (MB) of high-speed volatile memory per memory circuit board.

The directors move data into and out of the cache memory. In particular, the front-end directors operate as interfaces between the external hosts and the cache memory by moving data between the hosts and the cache memory. Similarly, the back-end directors operate as interfaces between the cache memory and the disk drives by moving data between the cache memory and the disk drives.

In one version of the above-described conventional data storage system, the director circuit boards and the memory circuit boards connect to a backplane interconnect that provides four multi-drop buses. The directors access the cache memory by coordinating use of the four multi-drop buses. Since there exists four multi-drop buses, different directors can simultaneously use different buses thus achieving higher bandwidth. Furthermore, each director has access to each of the multi-drop buses for fault tolerance purposes, i.e., there is another bus available if one particular bus fails.

In another version of the above-described conventional data storage system, the director circuit boards and the memory circuit boards connect to a backplane interconnect that provides a point-to-point communications pathway between each director circuit board and each memory circuit board. The point-to-point communications pathways between the director circuit boards and the memory circuit boards alleviate bus contention issues (e.g., delays in waiting for an available bus), thus reducing communications latencies between directors and the cache memory. Additionally, multiple pathways exist from each front-end director to the disk drives, through the cache memory and the back-end directors, thus providing for higher bandwidth and fault tolerance.

SUMMARY

Unfortunately, there are deficiencies to the above-described backplane interconnects. For example, regardless of whether the above-described backplane interconnects provide multi-drop buses or point-to-point pathways, such backplane interconnects are difficult to scale.

For instance, in the context of a data storage system having a backplane interconnect that provides multi-drop buses, the manufacturer of such a system typically wrestles with bus length limitations since it takes a significant amount of time for electrical signals to propagate along the buses. Such bus length limitations limits the amount of available connector area on the backplane interconnect (e.g., a conventional backplane interconnect that provides multi-drop buses is typically not more than a few feet in length), thus placing a significant restriction on the number of circuit boards that can connect through the backplane interconnect.

In the context of a data storage system having a backplane interconnect that provides point-to-point communications pathways between director circuit boards and memory circuit boards, the manufacturer of such a system typically wrestles with pathway density limitations since, if the circuit boards are to remain generic (i.e., not customized for only one specific slot), it takes a significant amount of circuit board space, connector space and backplane interconnect space to provide for all of the pathways between director and memory circuit boards. Accordingly, a conventional backplane interconnect that provides point-to-point communications pathways between director circuit boards and memory circuit boards typically does not support more than 16 to 32 circuit boards due to surface area limitations on the circuit boards and the backplane interconnects.

In view of the above-described size limitations, manufacturers typically include the largest backplane interconnect possible in all of their systems. This monolithic architecture approach enables the manufacturers to maintain a single backplane design as well as guarantee that customers of their low-end products will have the capability of expanding capacity (e.g., adding more directors, adding more cache memory, etc.) without having to replace the backplane interconnect. One deficiency to this approach is that it increases the cost of their low-end systems since low-end customers must pay for and receive a full-scale backplane interconnect. Another deficiency to this approach is that once the customer fully populates the system with the maximum number of circuit boards, there is little or no opportunity to expand capacity further (e.g., the maximum length of the multi-drop buses is reached). In particular, the system cannot be further scaled to create a larger system because the bandwidth of the backplane interconnect is already maximized.

At this point, customers cannot further upgrade their systems and thus typically attempt to fulfill their needs by buying another data storage system to handle their additional data storage requirements which tends to impose other drawbacks. For example, if customers attempt to network the data storage systems together, any coordination of resources between directors is now on the scope of network latencies times rather than backplane or circuit board times (i.e., seconds and tenths of seconds rather than milliseconds and microseconds). Additionally, there are record synchronization difficulties in coordinating and merging files and databases. Furthermore, there are higher maintenance costs since there are now two systems and a network to administer.

In contrast to the above-described conventional backplane interconnects which are limited in scalability, embodiments of the invention are directed to techniques for coupling circuit boards together using electrical switch-based backplane interconnects and fiber optic communications (e.g., Dense Parallel Optics) between the backplane interconnects. This enables the circuit boards to communicate with each other at backplane speeds regardless of whether the circuit boards connect to the same backplane interconnect or across multiple backplane interconnects. Accordingly, embodiments of the present invention essentially provide for a backplane interconnect system which is virtually extensible.

One embodiment of the invention is directed to an electronic system (e.g., a data storage system) which utilizes a backplane coupling assembly for coupling a first backplane interconnect to a second backplane interconnect. The first backplane interconnect is configured to carry first electrical backplane signals among a first set of circuit boards (e.g., a first set of directors). The second backplane interconnect is configured to carry second electrical backplane signals among a second set of circuit boards (e.g., a second set of directors). The backplane coupling assembly includes (i) a first switch configured to convey at least some of the first electrical backplane signals between circuit boards of the first set of circuit boards, and (ii) a second switch configured to convey at least some of the second electrical backplane signals between circuit boards of the second set of circuit boards. The backplane coupling assembly further includes a fiber optic cable joining the first and second switches together. The first and second switches are configured to exchange fiber optic signals through the fiber optic cable thus forming a cohesive backplane interconnect system between the first and second sets of circuit boards.

Here, communications extending between circuit boards connected to different backplane interconnects simply pass through two switches and the fiber optic cable and thus are not delayed beyond typical backplane interconnect speeds (e.g., milliseconds or microseconds). Additionally, the fiber optic cable is capable of carrying extremely high bandwidth (e.g., Dense Parallel Optics communications) and thus avoids becoming a bottleneck to communications between the two backplane interconnects.

Since this embodiment essentially represents a virtually expandable backplane interconnect system, manufacturers utilizing this embodiment no longer need to provide a full-scale backplane interconnect with unused capacity in low-end products. Rather, manufacturers can provide small or modest-sized backplane interconnects in lower-end products and still provide a scalable path for expanding the lower-end, to mid-tier, to higher-end products through a virtual backplane interconnect system that provides backplane interconnection speeds to circuit boards communicating across multiple backplane interconnects thereby providing scalable system-wide bandwidth and deterministic latencies.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for coupling circuit boards together using electrical switch-based backplane interconnects and fiber optic communications (e.g., Dense Parallel Optics) between the backplane interconnects. This enables the circuit boards to communicate with each other at backplane speeds regardless of whether the circuit boards connect to the same backplane interconnect or across multiple backplane interconnects. Accordingly, embodiments of the present invention essentially provide for a backplane interconnect system which is virtually extensible.

Figure 1:
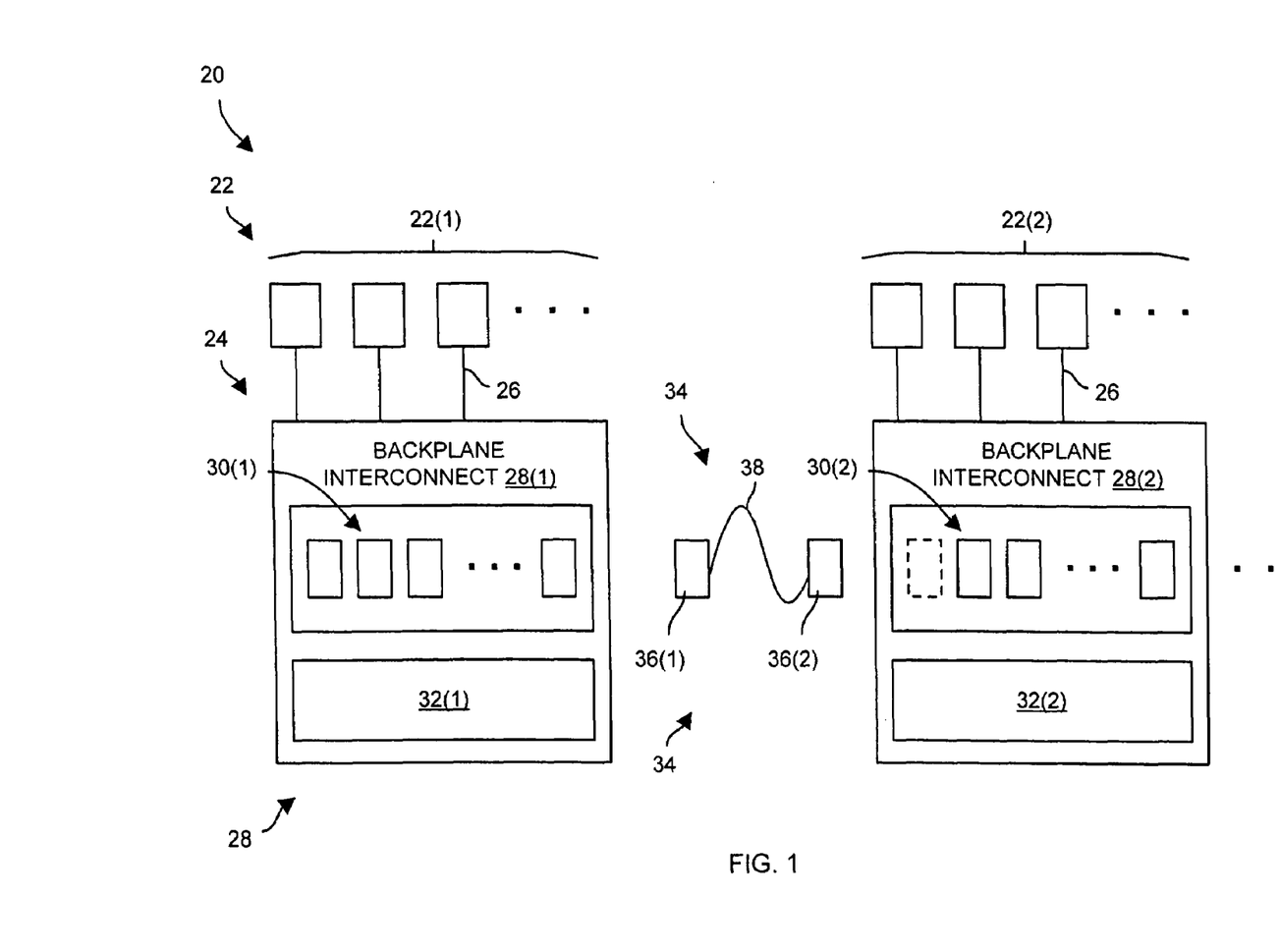
FIG. 1 is a block diagram of an electronic system in an unexpanded state, the electronic system being suitable for use by the invention.

FIG. 1 shows an electronic system 20 (e.g., a data storage system which stores and retrieves data on behalf of a set of external hosts) which is suitable for use by the invention. The electronic system 20 includes a first set of circuit boards 22(1) and a backplane interconnect system 24. Connections between circuit board connectors of the circuit boards 22(1) and backplane connectors of the backplane interconnect system 24 are represented logically by the lines 26. In the context of a data storage system, each circuit board 22 is capable of being equipped with a processor and memory, and ic capable of being configured to operate as a director and/or local cache, i.e., as a miniature caching system (e.g., a MicroSym) that performs data storage operations on behalf of one or more external host computers.

As shown in FIG. 1, the backplane interconnect system 24 includes a backplane interconnect 28(1) having a set of switches 30(1) and a fabric 32(1) of electrical traces. As will be explained in further detail later, the switches 30(1) are configured to route control and data messages between the circuit boards 22(1) (e.g., packets, frames, cells, etc. which are hereinafter generally referred to as packets). The fabric 32(1) carries electrical signals defining these control and data messages among the switches 30(1) and from the switches 30(1) to the circuit boards 22(1).

In one arrangement, there are two switches 30(1) connected to each circuit board 22(1), and the maximum number of hops any message must pass through when traveling from one circuit board 22(1) to another circuit board 22(1) is two (2). Such an arrangement is capable of providing high connectivity among the circuit boards 22(1) (i.e., one to many connectivity), low latency (i.e., a small number of hops), and redundancy (i.e., multiple paths for fault tolerance).

It should be understood that short distances of the fabric 32(1) in combination with the few number of switch hops between each circuit board 22(1) (e.g., a maximum of two) enables the circuit boards 22(1) to robustly communicate with each other while enjoying the bandwidth and communications speeds of local backplane (i.e., communications measured in milliseconds or microseconds). As will now be explained, the electronic system 20 is expandable by way of another backplane interconnect and a backplane coupling assembly that links the backplane interconnects together in a manner that achieves backplane-style bandwidth and response times between the two backplane interconnects thus enabling virtual expansion of the backplane interconnect system 24 while preserving backplane communication speeds.

As further shown in FIG. 1, the electronic system 20 further includes a set of circuit boards 22(2) which are currently disconnected from the first set of circuit boards 22(1). The backplane interconnect system 24 further includes a second backplane interconnect 28(2) having a second set of switches 30(2) and a second fabric 32(2) of electrical traces for routing control and data messages between the circuit boards 22(2) in a manner similar to that of the first set of switches 30(1) and the first fabric 32(1) of the first backplane interconnect 28(1). The backplane interconnect system 20 further includes a backplane coupling assembly 34 which is configured to connect the two backplane interconnects 28(1), 28(2).

However, as shown in FIG. 1, the backplane interconnect system 24 is currently in a disconnected or unexpanded state. Accordingly, only the circuit boards 22(1) and backplane interconnect 28(1) are presently in operation. This situation is suitable for a user who has acquired only the circuit boards 22(1) and backplane interconnect 28(1), but that wishes to have the option of expanding the electronic system to further include the circuit boards 22(2) and backplane interconnect 28(2) at some point in the future.

The backplane coupling assembly 34 includes a first expansion switch 36(1), a second expansion switch 36(2), and a fiber optic cable 38 that fiber optically connects the first and second expansion switches 36(1), 36(2) (collectively, expansion switches 36). It should be understood that the expansion switches 36 are different than the original switches 30(1), 30(2) of the backplane interconnects 28(1), 28(2) because the expansion switches 36 are equipped with transducer circuitry and fiber optic ports for optical communications therebetween. A switch which is suitable for use as an expansion switch 36 is an optically enabled integrated circuit (IC) having a built-in transceiver, programmable/configurable network processor (e.g., framer, mapper, etc. for processing packets), memory, etc. Further details of the invention will now be provided with reference to FIG. 2.

Figure 2:
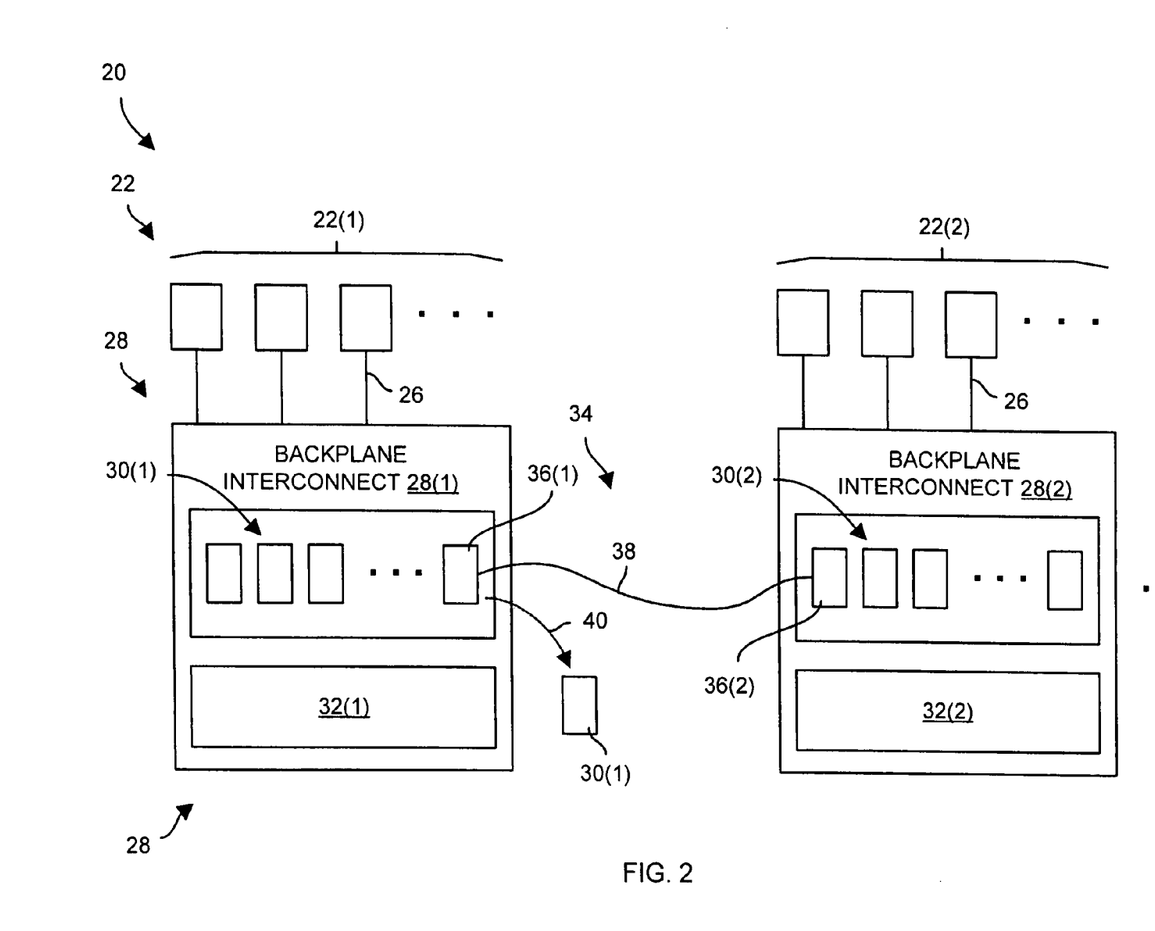
FIG. 2 is a block diagram of the electronic system of FIG. 1 in the expanded state.

FIG. 2 shows the electronic system 20 in a connected or expanded state. Here, the two backplane interconnects 28(1), 28(2) are connected via the backplane coupling assembly 34. That is, a user has removed one of the original switches 30 from the backplane interconnect 28(1) (see the arrow 40), and replaced that original switch 30 with the first expansion switch 36(1). As will be explained in further detail shortly, some arrangements of the invention do not require exposure of optical interfaces when installing the expansion switch 36(1). Rather, such optical interfaces remain protected and free of contamination, and the user simply effectuates an electrical connection between the expansion switch 36(1) and the backplane interconnect 28(1).

As further shown in FIG. 2, the user has similarly installed the second expansion switch 36(2) onto the backplane interconnect 28(2). Again, the user simply engages electrical interfaces (e.g., electrical connectors) between the expansion switch 36(2) and the backplane interconnect 28(2) to install the backplane coupling assembly 34 onto the backplane interconnect 28(2). To illustrate this feature, an empty switch socket or connector is illustrated on the backplane interconnect 28(2) as a dashed line in FIG. 1, and the second expansion switch 36(2) is plugged into that socket in FIG. 2.

At this point, the two backplane interconnects 28(1), 28(2) are linked together by way of the backplane coupling assembly 34. During operation, all of the circuit boards 22(1) are capable of communicating with each other through the backplane interconnect 28(1), as explained earlier. In particular, the circuit boards 22(1) exchange electrical signals with each other through the original switches 30(1). Also, some circuit boards 22(1), which had communicated through the removed switch 30(1), now electrically communicate with each other through the newly added expansion switch 36(1) in the same manner as before. Accordingly, there is still a maximum of two hops between any two circuit boards 22(1).

With reference to the other backplane interconnect 28(2), all of the circuit boards 22(2) are capable of communicating with each other through the backplane interconnect 28(2) in a similar manner to that for the backplane interconnect 28(1). In particular, the circuit boards 22(2) exchange electrical signals with each other through the switches 30(2). Furthermore, the expansion switch 36(2) is connected to certain circuit boards 22(2), and those circuit boards 22(2) electrically communicate with other circuit boards 22(2) through the expansion switch 34(2) in a similar manner. Accordingly, there is a maximum of two hops between any two circuit boards 22(2), and thus low latency for fast communications.

It should be further understood that the circuit boards 22(1) are capable of communicating with the circuit boards 22(2) through the backplane coupling assembly 34. Here, if the expansion switch 36(1) receives a message from a circuit board 22(1) for a circuit board 22(2), the expansion switch 36(1) simply steers that message through the fiber optic cable 38 to the other expansion switch 36(2). The expansion switch 36(2) then steers that message to the proper circuit board 22(2). Similarly, if the expansion switch 36(2) receives a message from a circuit board 22(2) for a circuit board 22(1), the expansion switch 36(2) simply directs that message through the fiber optic cable 38 to the other expansion switch 36(1). The expansion switch 36(1) then directs that message to the proper circuit board 22(1). Accordingly, there is robust communications between circuit boards 22 across the backplane interconnects 28(1), 28(2). Moreover, high bandwidth fiber optic communications such as Dense Parallel Optics is well-suited for carrying high traffic (e.g., a large number of control and data messages) between the backplane interconnects 28(1), 28(2) so that the backplane coupling assembly 34 does not create a problematic bottleneck.

It should be appreciated that, for communications between circuit boards 22(1), 22(2) across the backplane interconnects 28(1), 28(2), there is at most four hops for each message (i.e., an original switch 30, the two expansion switches 36 and another original switch 30). Moreover, signal propagation through the fiber optic cable 38 occurs at light speed thus enabling the length of the fiber optic cable 38 to be relatively long (e.g., several feet) to provide better flexibility when locating the backplane interconnects 28(1), 28(2) relative to each other. Nevertheless, communications between the circuit boards 22(1), 22(2) across backplane interconnects 28(1), 28(2) still occurs at backplane speeds (e.g., nanoseconds or microseconds).

Furthermore, the above-described expansion process is repeatable by adding more backplane interconnects and more fiber optic assemblies (e.g., in a star topology, in a daisy-chain topology, etc.) thus providing a mechanism for virtually expanding the backplane interconnect system 24 essentially indefinitely. Thus, backplane interconnect system 24 is essentially a single, cohesive interconnecting fabric for the circuit boards 22 that provides bandwidth and connection speeds characteristic of a single, local backplane even though the backplane interconnect system 24 includes multiple backplane interconnects 28(1), 28(2) and is virtually expandable. Further details of the backplane coupling assembly 34 will now be provided with reference to FIG. 3.

Figure 3:
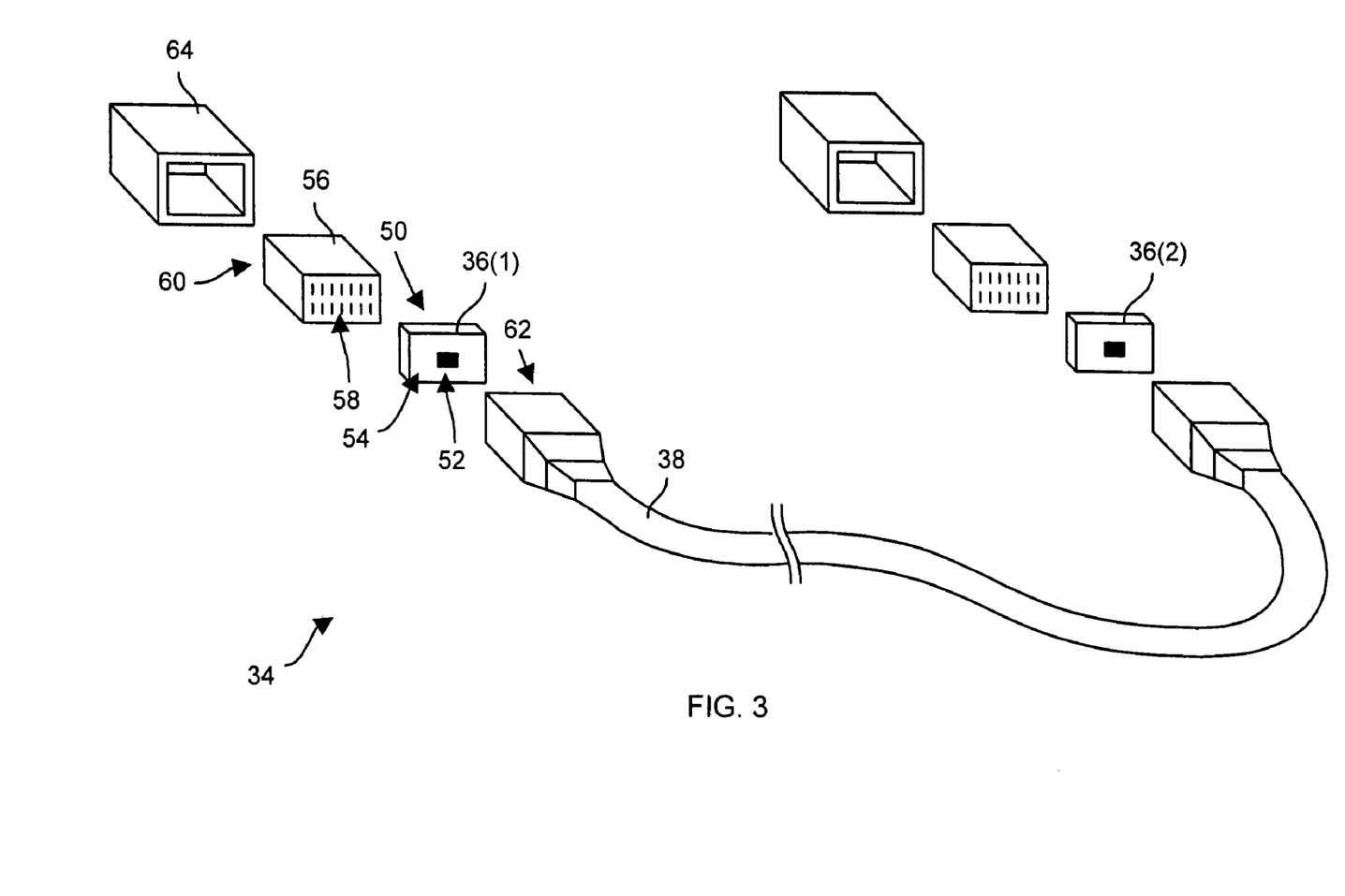
FIG. 3 is a perspective view of a backplane coupling assembly of the electronic system of FIGS. 1 and 2.

FIG. 3 is an exploded perspective view of the backplane coupling assembly 34. By way of example only, the expansion switches 36(1), 36(2) are optically enabled ICs which reside at the ends of the backplane coupling assembly 34 in an integrated manner. That is, each expansion switch 36 has an electrical interface 50 (e.g., electrical contacts), an optical interface 52 (e.g., fiber ends, self-configuring laser/diode circuitry, etc.), and processing circuitry 54. The electrical interface 50 faces an adapter 56 having an electrical layout 58 that converts a contact layout (i.e., the electrical interface 50) of the optically enabled IC to a standard connector layout 60 (e.g., SFP, XENPAK, Snap 12, etc.). Additionally, the optical interface 52 faces an end 62 the fiber optic cable 38 (i.e., one or more optical fibers) which are fused directly from laser diodes contained in the optical interface 52 to the fiber optic strand contained in the fiber optic cable 38 which provides minimum light energy loss and minimum distortion.

As shown in FIG. 3, a frame or housing 64 is provided to contain an adapter 56, an expansion switch 36 and fiber optic cable end 58. Accordingly, when a user installs the backplane coupling assembly 34 onto the backplane interconnects 28(1), 28(2) (also see FIGS. 1 and 2), the user does not need to expose the optics of the assembly 34. Rather, the optics remain sealed and clean and the user simply mates the assembly 34 electrically with the backplane interconnects 28(1), 28(2). In particular, the user engages a first end of the assembly 34 with the first backplane interconnect 28(1) (e.g., the user connects the standard connector layout of the adapter 56 onto a socket of the backplane interconnect 28(1)), and a second end of the assembly 34 with the second backplane interconnect 28(1) (e.g., the user connects the standard connector layout of the other adapter 56 onto a socket of the backplane interconnect 28(2)). Accordingly, there is no need for cleaning and mating optical connectors thus decreasing costs for maintaining and servicing the electronic system 20. Moreover, the electrical connectors can be configured to be self-cleaning (e.g., upon mating) so that no manual cleaning is required whatsoever.

As mentioned above, each expansion switch 36 includes processing or switching circuitry 54 that enables the switch 36 to route control and data messages passing therethrough. In one arrangement, the circuitry 54 includes programmable or configurable circuits (e.g., memory and a microprocessor) thus enabling the switch 36 to perform networking operations (e.g., digital signal processing, framing/mapping, etc.) as well as operate as an optical transceiver (e.g., using lasers, detectors, modulators, etc.).

Additionally, a variety of message or packet-based communications protocols are suitable for use by the backplane coupling assembly 34. For example, in one arrangement, the connector layouts 60 of the adapters 56 have an SFP layout, and the switches 36 are configured to communicate using the Fibrechannel protocol. In another arrangement, the connector layouts 60 of the adapters 56 have a XENPAK layout, and the switches 36 are configured to communicate using the 10 GbE protocol. In yet another arrangement, the connector layouts 60 of the adapters 56 have a Snap 12 Cable layout, and the switches 36 are configured to communicate using a Parallel Optics protocol, e.g., the Dense Parallel Optics protocol. Further details of the invention will now be provided with reference to FIG. 4.

Figure 4:
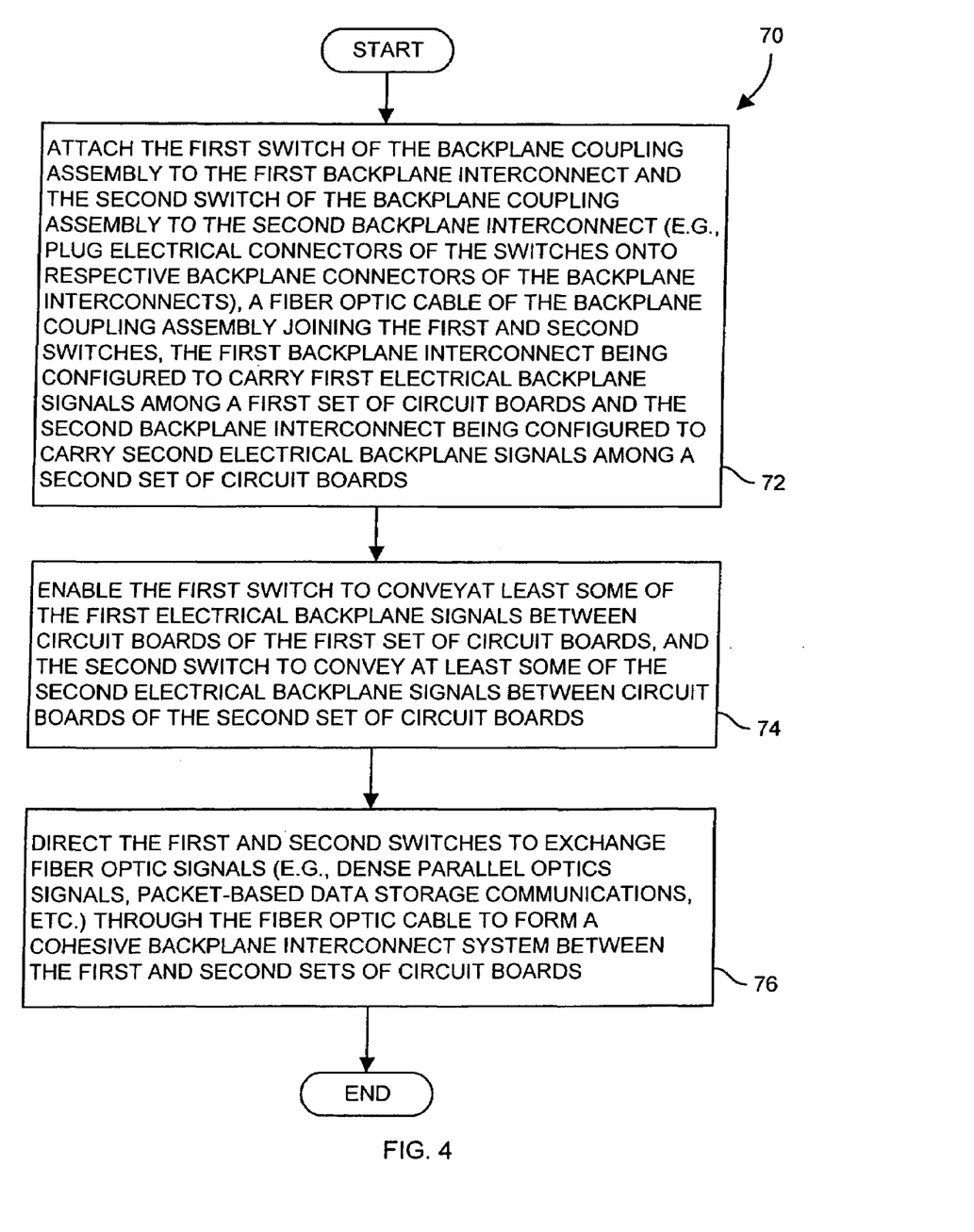
FIG. 4 is a flowchart of a procedure for putting the electronic system of FIGS. 1 and 2 into the expanded state.

FIG. 4 is a flowchart of a procedure 70 summarizing how a user places the electronic system 20 into the expanded state. In step 72, the user attaches the first expansion switch 36(1) of the backplane coupling assembly 34 to the first backplane interconnect 28(1), and the second expansion switch 36(2) of the backplane coupling assembly 34 to the second backplane interconnect 28(2) (also see FIGS. 1 and 2). As mentioned earlier, in some arrangements, the user simply plugs electrical connectors of the assembly 22 onto the backplane interconnects 28(1), 28(2) thus alleviating the need for any cleaning optical equipment. The backplane interconnects 28(1), 28(2) are now joined through the fiber optic cable 38 of the backplane coupling assembly 34.

In step 74, the user enables the first expansion switch 36(1) to convey at least some of the first electrical backplane signals between the circuit boards 22(1), and the second expansion switch 36(2) to convey at least some of the second electrical backplane signals between the circuit boards 22(2). In one arrangement, the user simply allows the expansion switches 36 to perform automated routines to obtain configuration information from the other switches 30 upon installation (e.g., upon power-up) similar to that for a data communications device when it is initially connected to a network. Accordingly, the expansion switches 36 are now configured to participate in routing control and data messages locally within each backplane interconnect 28(1), 28(2) in an intra-backplane manner.

In step 76, the user directs the first and second expansion switches 36 to exchange fiber optic signals through the fiber optic cable 38 to form a cohesive backplane interconnect system 24 between the first and second sets of circuit boards 22(1), 22(2). As a result, the electronic 20 is now expanded to include a larger number of circuit boards 22 and thus is capable of providing higher throughput, e.g., the circuit boards 22(1), 22(2) work together in an integrated manner as a consolidated data storage system to perform more data storage operations in a fixed amount of time. Further details of the invention will now be provided with reference to FIG. 5.

Figure 5:
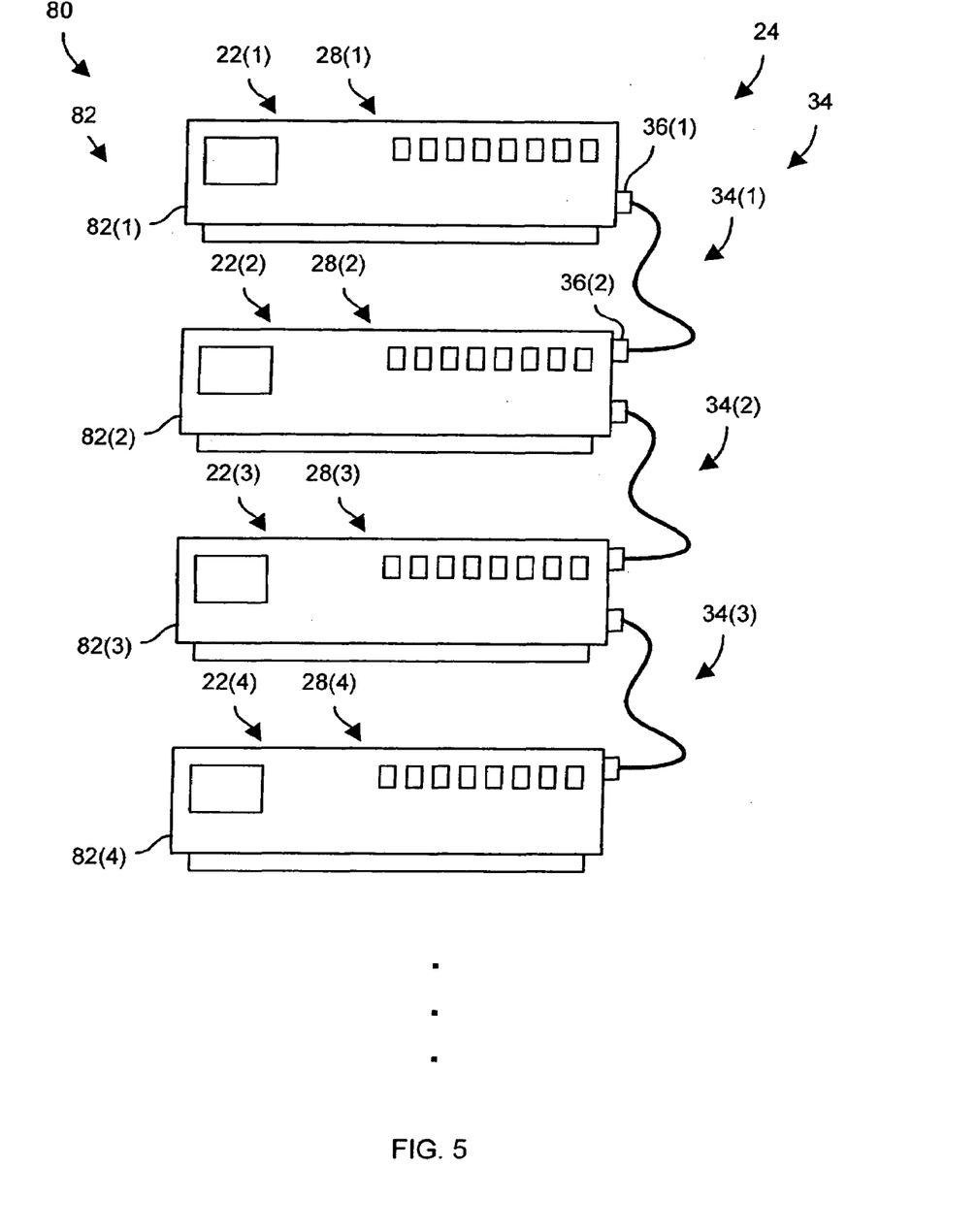
FIG. 5 is a box-to-box configuration for the electronic system of FIGS. 1 and 2.

FIG. 5 shows a box-to-box configuration 80 which is suitable for use by the electronic system 20. The box-to-box configuration 80 includes multiple individual boxes 82(1), 82(2), . . . (collectively, boxes 82). Each box 82 has a separate set of circuit boards 22 and backplane interconnect 28. For example, the box 82(1) has a first set of circuit boards 22(1) and a backplane interconnect 28(1), the box 82(2) has another set of circuit boards 22(2) and another backplane interconnect 28(2), and so on. Although the fabrics 32 (i.e., the multi-layered boards) of the backplane interconnects 28 preferably reside within the boxes 82 for protection, the switches 30 of the backplane interconnects 28 may reside either within the boxes 82 for protection or outside the boxes 82 for convenient access.

Additionally, a set of backplane coupling assemblies 34 connects the boxes 82 together. In particular, a first backplane coupling assembly 34(1) connects the boxes 82(1), 82(2) together, another backplane coupling assembly 34(2) connects the boxes 82(2), 82(3) together, and so on. Accordingly, by way of example only, the boxes 82 are connected together in a daisy chain manner.

It should be understood that, in the box-to-box configuration 80 of FIG. 5, each box 82 of the electronic system 20 preferably has a separate set of operating resources (e.g., a separate housing, a separate power supply, a separate cooling assembly, etc.). Accordingly, a user may initially have only one box 82 and then add a second box 82 to increase capacity.

To further increase capacity, the user can simply add another box 82. Each time the user adds a box 82, the user simply removes an original switch 30 from one of the boxes 82 and plugs in an expansion switch 36 of a backplane coupling assembly 34 connected to another box 82 (also see FIGS. 1 and 2). As a result, the user benefits from the additional capacity provided by the newly added box 82 (e.g., increased processing power), but maintains a single, cohesive backplane interconnect system 24 between all of the circuit boards 22 with backplane speeds and bandwidth, thus enabling the circuit boards 22 to operate as if they are all locally connected to a single backplane even though they are distributed among different boxes 82. Further details of the invention will now be provided with reference to FIG. 6.

Figure 6:
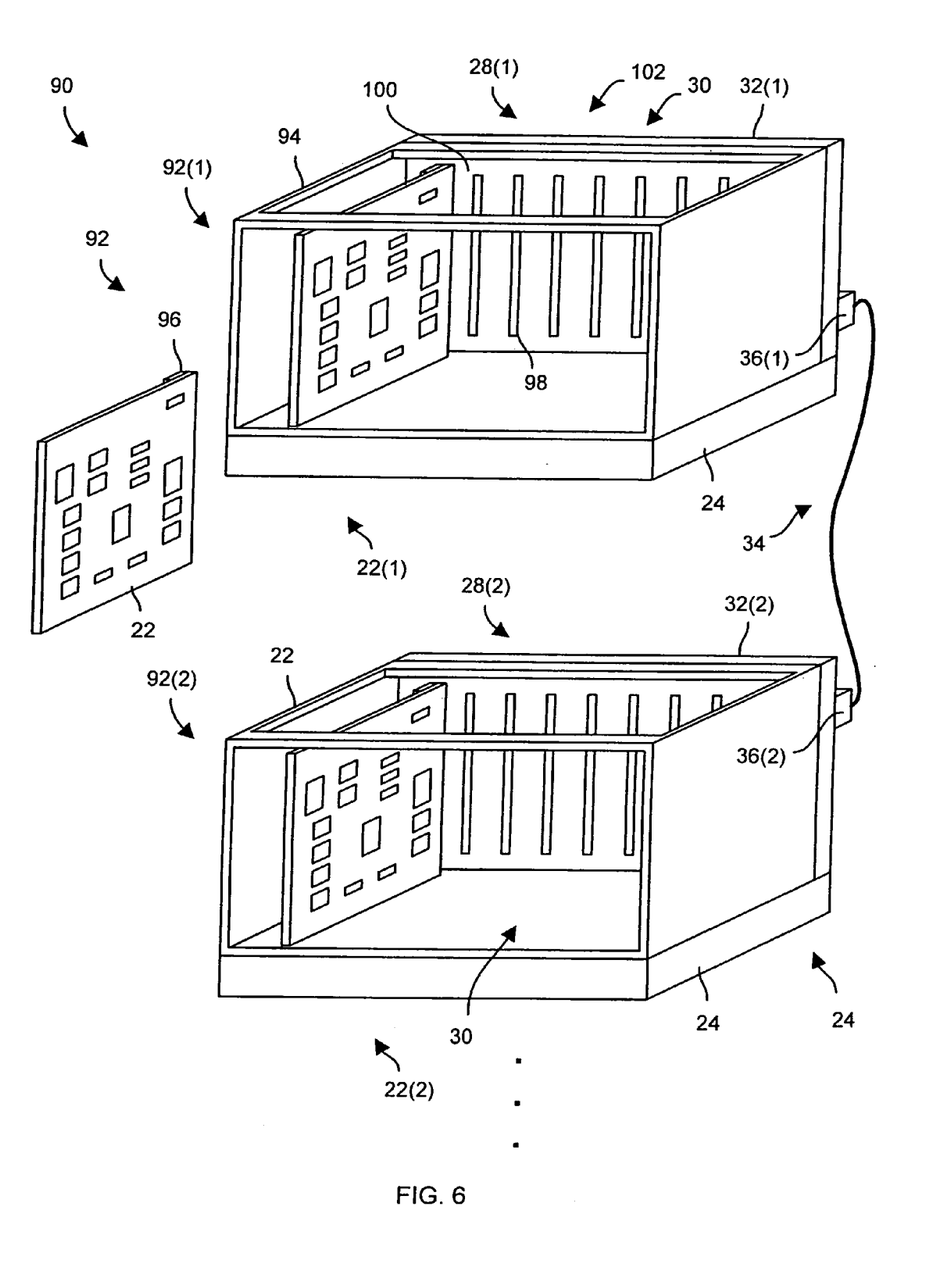
FIG. 6 is a rack mount configuration for the electronic system of FIGS. 1 and 2.

FIG. 6 shows a rack mount configuration 90 which is suitable for use by the electronic system 20. The rack mount configuration 90 includes multiple card cage assemblies 92(1), 92(2), . . . (collectively, card cage assemblies 92). Each card cage assembly 92 has, among other things, a card cage 94, a separate set of circuit boards 22 and backplane interconnect 28. The card cage 94 holds the set of circuit boards 22 so that they are substantially parallel to each other, and so that they align and connect with the backplane interconnect 28 in a substantially perpendicular manner, i.e., circuit board connectors 96 of the circuit boards 22 mate with backplane connectors 98 mounted to the front surfaces 100 of the fabric boards 32. As shown in FIG. 6, the card cage assembly 92(1) has a first set of circuit boards 22(1) and a backplane interconnect 28(1), the card cage assembly 92(2) has another set of circuit boards 22(2) and another backplane interconnect 28(2), and so on (only a few circuit boards 22 are shown for simplicity). In one arrangement, the switches 30 of the backplane interconnects 28 reside on the back surfaces 102 of the fabrics 32. In another arrangement, the switches 30 of the backplane interconnects 28 reside on cards that engage the surfaces of the fabrics 32 in a manner similar to that of the circuit boards 22 (e.g., the fabrics 32 are two-sided boards and the switches engage the back sides of the fabrics 32).

Additionally, a set of backplane coupling assemblies 34 connect the card cage assembly 92 together. In particular, a first backplane coupling assembly 34 connects the card cage assemblies 92(1), 92(2) together. Similarly, another backplane coupling assembly 34 is capable of connecting another card cage assembly to the card cage assemblies 92(2), and so on. Accordingly, by way of example only, the card cage assemblies 92 connect together in a daisy chain manner.

It should be understood that, in the rack mount configuration 90 of FIG. 6, each card cage assembly 92 of the electronic system 20 is configured to mount to the frame of a rack mount cabinet, i.e., an assembly of vertical and horizontal rails defining a standard size (e.g., 19 inches) for components that mount to the frame in a stacked or tiered manner. Thus, a user may begin with only one card cage assembly 92 and later add a second card cage assembly 92 to increase capacity.

To further increase capacity, the user simply adds another card cage assembly 92. In a manner similar to that for the earlier-described box-to-box configuration 80 of FIG. 5, each time the user adds another card cage assembly 92, the user simply removes an original switch 30 from one card cage assembly 92 and, in its place, plugs in an expansion switch 36 of a backplane coupling assembly 34 connected to the new card cage assembly 92 (also see FIGS. 1 and 2). Thus, the user benefits from the additional capacity provided by the newly added card cage assembly 92 (e.g., increased processing power), but maintains a consolidated backplane interconnect system 24 between all of the circuit boards 22 with backplane speeds and bandwidth, thereby enabling the circuit boards 22 to operate as if all of the circuit boards 22(1), 22(2), . . . are locally connected to a single backplane even though the circuit boards 22(1), 22(2), . . . are distributed among different backplane interconnects 28 of different card cage assemblies 92. Further details of the invention will now be provided with reference to FIGS. 7–9.

Figure 7:
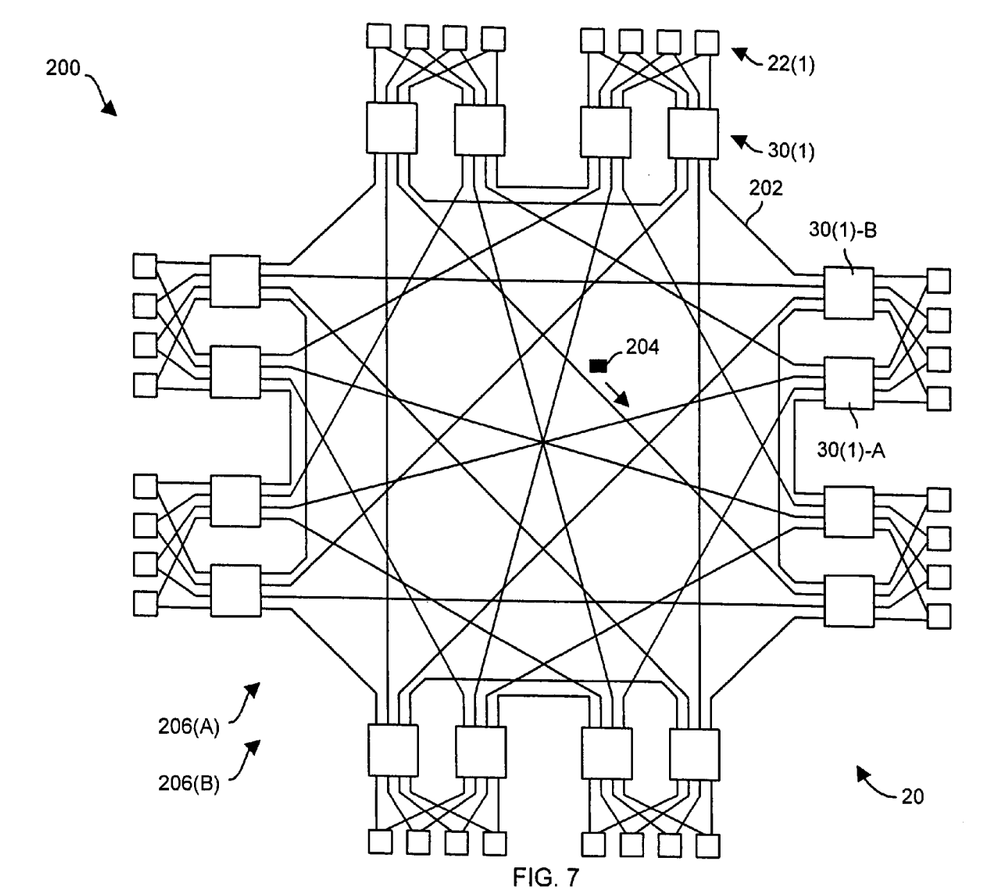
FIG. 7 is a switch fabric layout for pathways between circuit boards which is suitable for use by the invention.
Figure 8:
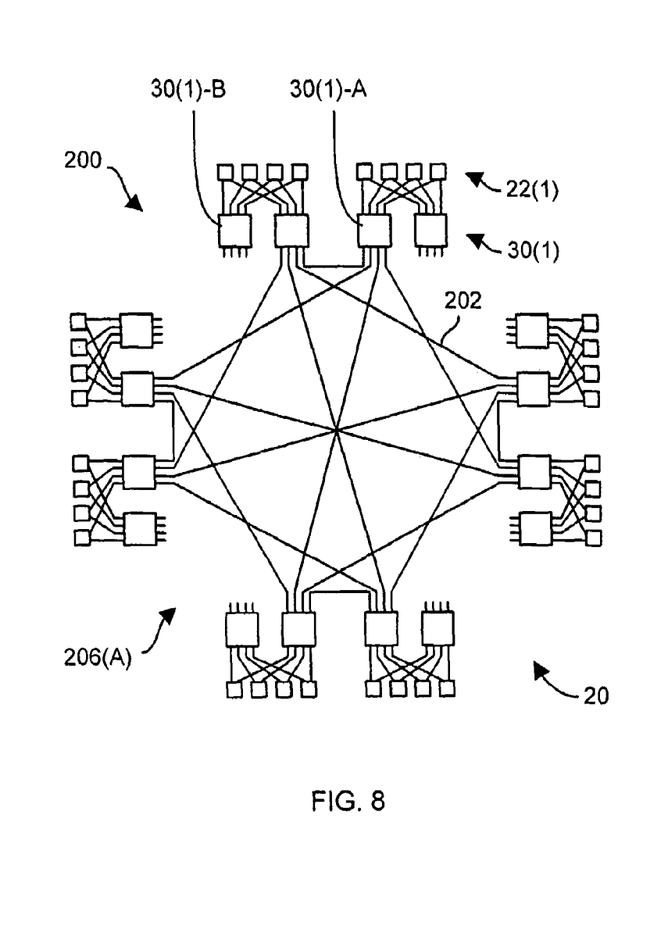
FIG. 8 is a first set of pathways for the switch fabric of FIG. 7.
Figure 9:
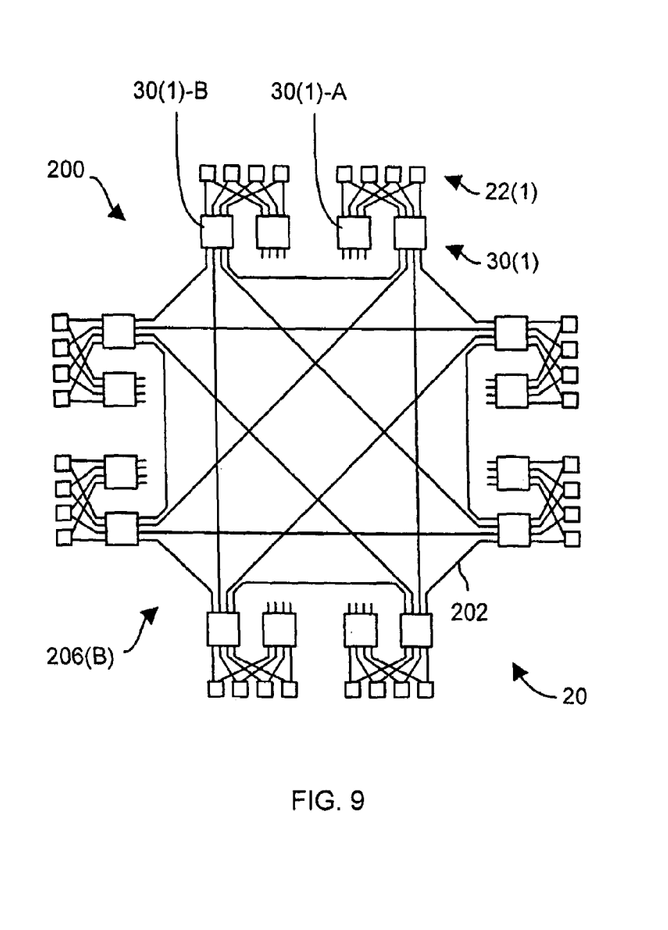
FIG. 9 is a second set of pathways for the switch fabric of FIG. 7.

FIGS. 7–9 show a switch fabric layout 200 for pathways 202 between circuit boards 22 which is suitable for use by the electronic system 20. By way of example only, each pathway 202 has 16 wires (full duplex with four differential serial line pairs in each direction configured to carry 3.125 Gb/s raw data per serial differential pair). As shown in FIG. 7, there is high connectivity provided by the switch fabric layout, i.e., many routes that control and data messages 204 can travel in order to pass from one circuit board 22(1) to another circuit board 22(1) (represented individually as small squares in FIGS. 7–9). In one arrangement, the switches 30(1) (moderately-sized squares in FIGS. 7–9) are designated either as a switch 30(1)-A for a first network 206(A) as shown in FIG. 8, or a switch 30(1)-B for a second network 206(B) as shown in FIG. 9. For this arrangement, on either network 206(A), 206(B), there is a maximum number of two (2) switch hops that any message 204 must pass through in order to travel from one circuit board 22(1) to another circuit board 22(1). Furthermore, for this arrangement, there is low latency and robust fault tolerance since the second network 206(B) provides a backup two-hop pathway 202 for any pathway failure on the first network 206(A), and similarly the first network 206(A) provides a backup two-hop pathway 202 for any pathway failure on the second network 206(B).

It should be understood that the pathways 202 preferably reside in a multi-layered fabric board of a backplane interconnect 28 (e.g., see the fabric boards 32(1), 32(2) in FIG. 6). These pathways 202 in combination with the few number of switch hops between each circuit board 22(1) (e.g., a maximum of two) enables the circuit boards 22(1) to robustly communicate with each other while enjoying communications characteristics (e.g., speed, etc.) of local backplane (i.e., communications measured in nanoseconds or microseconds). As will now be explained in further detail with reference to FIGS. 10 and 11, the electronic system 20 is expandable in a manner that preserves these features thus enabling the user to maintain a cohesively operating system.

Figure 10:
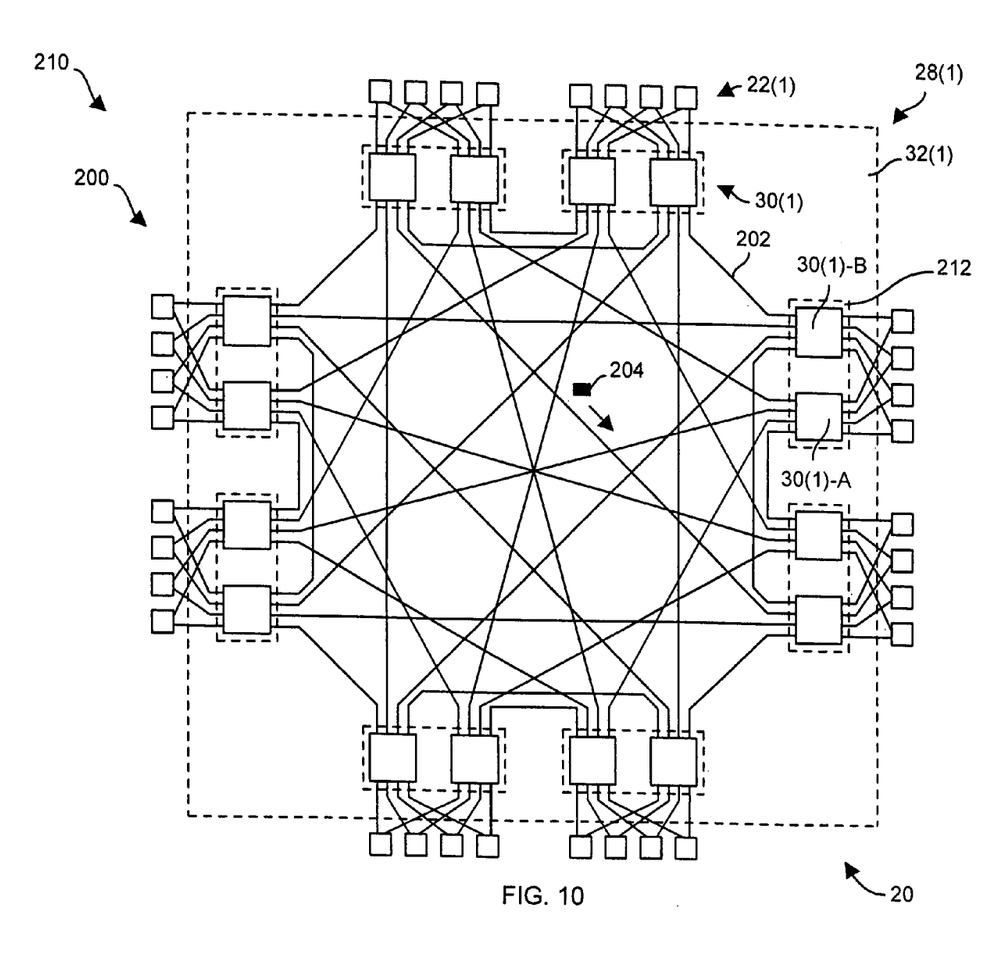
FIG. 10 is a backplane interconnect arrangement for the switch fabric of FIG. 7.

FIG. 10 shows a partitioning or architecture scheme 210 which is suitable for use by the electronic system 20 when the electronic system 20 has the switch fabric layout 200 of FIGS. 7–9. For the scheme 210, the pathways 202 reside in a backplane interconnect 28(1) having a fabric board 32(1), and the switches 30(1) which attach to the fabric board 32(1) (also see the block diagram of FIG. 1 showing the backplane interconnect 28(1) having the switches 30(1) and the fabric 32(1)). In one arrangement, the switches 30(1) reside on small circuit boards 212 (e.g., daughter cards) that fasten to the fabric board 32(1) (e.g., to the back surface 102 of the fabric board 32(1) in FIG. 6). Accordingly, a user can remove two switches 30(1) (i.e., a pair of switches 30(1)-A, 30(1)-B) by detaching a card 212 from the fabric board 32(1). This provides a simple, elegant and convenient way for a user to expand the electronic system 20, as will now be explained in further detail.

To expand the electronic system of FIG. 10, the user removes a card 212 having two switches 30(1)-A, 30(1)-B. The user then attaches the end 214(1) of a backplane coupling assembly 34 in place of the removed card 212. In one arrangement, this end 214(1) takes the form of an expansion circuit board (e.g., a daughter card) of similar geometry to the removed card 212. In another arrangement, the end 214(1) takes the form of a cable plug that engages with the fabric in place of the card 212. The opposite end 214(2) of the backplane coupling assembly 34 connects to another backplane interconnect 28(2) and additional circuit boards 22(2).

Figure 11:
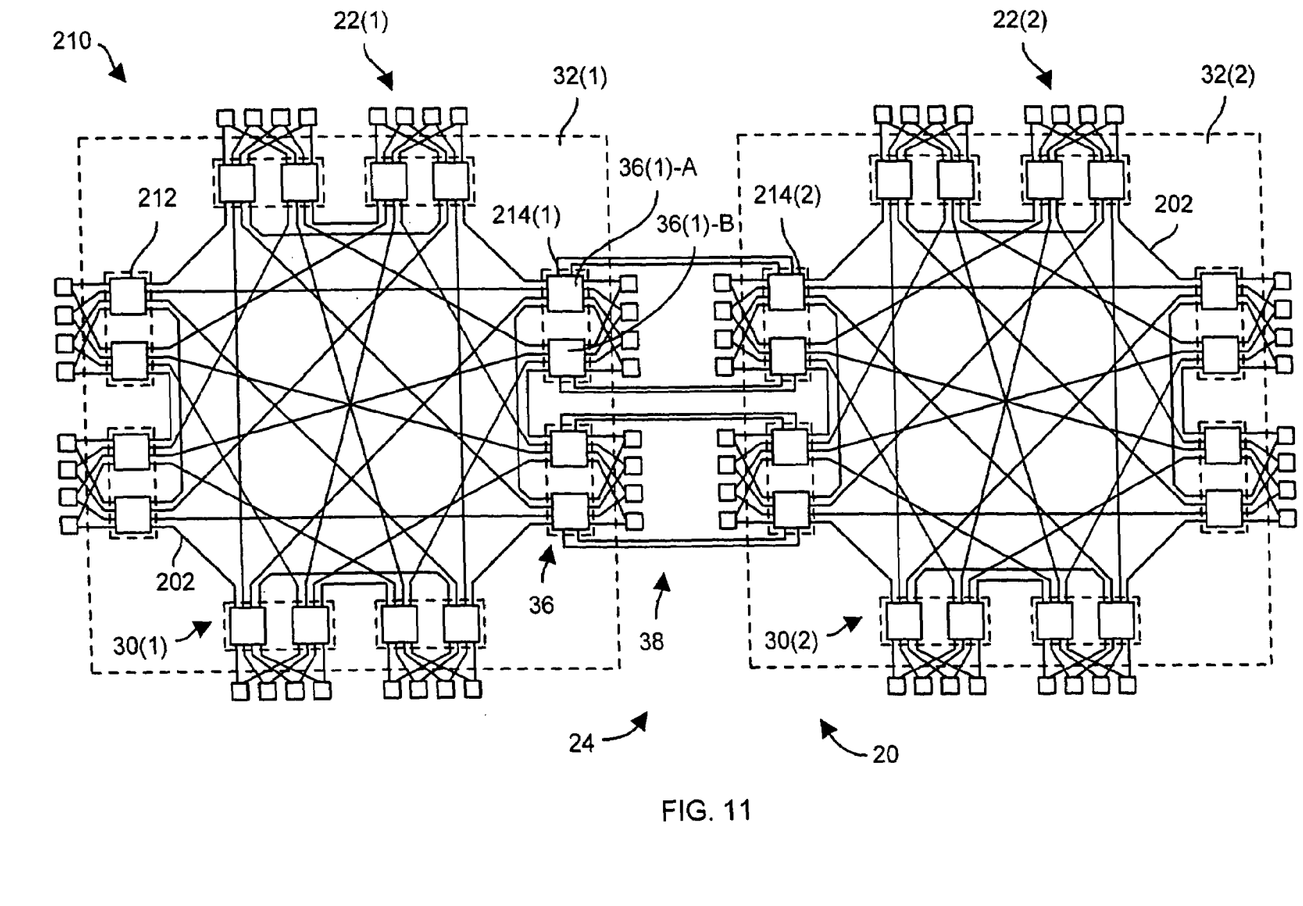
FIG. 11 is an expanded backplane interconnect arrangement for the switch fabric of FIG. 7.

As shown in FIG. 11, the backplane coupling assembly 34 includes a pair of expansion switches 36(1)-A, 36(1)-B which take the place of the original switches 30(1)-A, 30(1)-B. That is, the expansion switch 36(1)-A forms part of the network 206(A) (see FIG. 8) and the expansion switch 36(1)-B forms part of the network 206(B) (see FIG. 9), thereby enabling the circuit boards 22(1) to remain in communication with each other with high connectivity and fault tolerance.

However, as explained earlier, the expansion switches 36 differ from the original switches 30 in that the expansion switches 36 have optical technology (e.g., transducers, lasers, photodiodes, optical ports, etc.). Accordingly, the expansion switches 36 are capable of providing optical communications signals between multiple backplane interconnects 28(1), 28(2) through the fiber optic cable 38 of the backplane coupling assembly 34. Such optical communications are fast (signal propagation occurs at the speed of light) and at high bandwidth (e.g., Dense Parallel Optics). Accordingly, the backplane coupling assembly 34 links the backplane interconnects 28(1), 28(2) together to provide backplane-style bandwidth and response times between the two backplane interconnects 28(1), 28(2) thus enabling expansion of the electronic system 20 in a cohesive manner.

As shown in FIG. 11, each expansion switch 36 includes multiple ports. In particular, each expansion switch 36 includes four electrical ports that connect to respective circuit boards 22, four other electrical ports that connect to respective switches 30, and two optical ports that connect to the fiber optic cable 38. This fact, in combination with the use of multiple switches 36 and multiple backplane coupling assemblies 34 between the backplane interconnects 28(1), 28(2), provides robust connectivity for the backplane interconnect system 24 as a whole (e.g., four fiber optic pathways between the backplane interconnects 28(1), 28(2)). If one fiber optic pathway fails, the switches 36 automatically detect the failure and switch over to a backup pathway in a self-healing, fault tolerant manner. Further details of the invention will now be provided with reference to FIG. 12.

Figure 12:
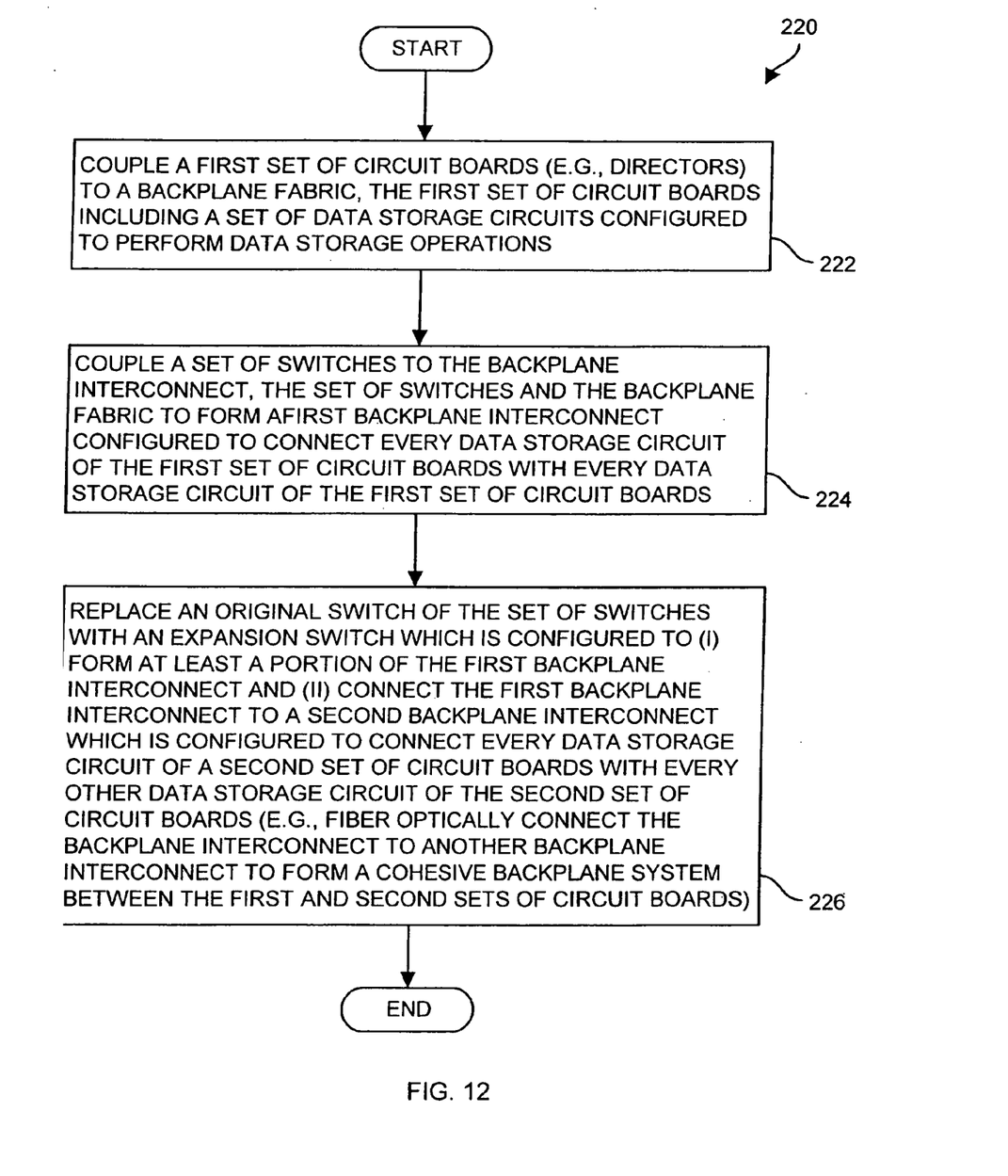
FIG. 12 is a flowchart of a procedure for expanding the backplane interconnect arrangement of FIG. 9 to obtain the expanded backplane interconnect arrangement of FIG. 11.

FIG. 12 is a flowchart of a procedure 220 which is performed by a user when scaling the layout 210 of FIG. 10 for the electronic system 20 (e.g., a data storage system). In step 222, the user couples a first set of circuit boards 22(1) (e.g., directors or MicroSyms configured to perform data storage operations), to the backplane fabric board 32(1).

In step 224, the user couples the switches 30(1) to the backplane fabric board 32(1). As a result, the switches 30(1) and the backplane fabric board 32(1) form the backplane interconnect 28(1) configured to connect every circuit board 22(1) with every other circuit board 22(1).

In step 226, the user replaces an original switch 32(1) with an expansion switch 36 which is configured to (i) form at least a portion of the backplane interconnect 28(1), and (ii) connect the backplane interconnect 28(1) to a second backplane interconnect 28(2) which is configured to connect every circuit board 22(2) with every other circuit board 22(2). That is, the user attaches the end of the backplane coupling assembly 34 to the backplane interconnect 28(1) to integrate the two backplane interconnects 28(1), 28(2) to form an integrated backplane fabric. The circuit boards 22(1), 22(2) are now capable of communicating fiber optically across the backplane interconnects 28(1), 28(2) at backplane speeds.

Accordingly, the user is capable of purchasing and operating a small modular system (steps 222 and 224), and subsequently scaling the system by interconnecting the bandwidth of the backplane interconnects 28(1), 28(2) across multiple modular platforms to obtain a very high bandwidth system. This newly formed system expands the bandwidth beyond that of the earlier-described conventional monolithic storage systems.

As mentioned above, embodiments of the invention are directed to techniques for coupling circuit boards 22 together using electrical switch-based backplane interconnects 28 and fiber optic communications (e.g., Dense Parallel Optics) between the backplane interconnects 28. This enables the circuit boards 22 to communicate with each other at backplane speeds regardless of whether the circuit boards 22 connect to the same backplane interconnect 28 or across multiple backplane interconnects 28. Accordingly, embodiments of the present invention essentially provide for a backplane interconnect system 24 which is virtually extensible.

While this invention has been particularly shown and described with references to preferred embodiments thereof, it will be understood by those skilled in the art that various changes in form and details may be made therein without departing from the spirit and scope of the invention as defined by the appended claims.

For example, the electronic system 20 was described above as being a data storage system that stores and retrieves data on behalf of external hosts by way of example only. In other arrangements, the electronic system 20 operates as other types of machines such as a general purpose computer, a server (e.g., a file server, a web server, etc.), a networking system, a specialized system (e.g., a real-time equipment controller), etc.

Additionally, it should be understood that the switches 30, 36 were described above as being configured to route control and data messages by way of example only. In one arrangement, the switches 30, 36 simply steer or direct signals between multiple possible ports (e.g., a multiplexing operation based on an identification or control signal). In another arrangement, the switches 30, 36 operate as data communications devices, i.e., the switches 30, 36 route data elements (i.e., packet-switched control and data messages) by examining destination and/or source addresses and performing lookup up operations to select ports from a table.

Furthermore, it should be understood that the switches 36 were described above as being optically enabled ICs residing in housings at the ends of a fiber optic cable. Other arrangements are suitable as well such as processors and fiber optic transducers mounted to daughter cards or the backplane fabric boards 32, and traditional fiber optic cables with fiber optic interfaces attaching to the transducers to form fiber optic connections. Also, it should be understood that other ICs and circuits are capable of being housed along with the optically enabled ICs to form "smart" optical cables that interconnect backplane fabrics 32.

Additionally, it should also be noted that the backplane coupling assembly 34 was described above as utilizing a fiber optic cable 38 by way of example only. In other arrangements, the backplane coupling assembly 34 utilizes a different communications medium such as a copper cable medium (e.g., twisted pairs, twinax, coax, etc.), wireless communications, etc.

Furthermore, it should be understood that the particular topologies for the backplane interconnects 28 were provided by way of example only. Moreover, the expansion topologies of daisy chaining backplane interconnects 28 was provided by way of example only. In other arrangements, the topologies are different, e.g., star topologies, hub-and-spoke topologies, irregular topologies, etc. Furthermore, each backplane interconnect 28 is not limited to connecting to only one or two other backplane interconnects 28. Rather, each backplane interconnect 28 is capable of connecting to several other backplane interconnects 28 (e.g., more than two). Such modifications and enhancements are intended to be within the scope of various embodiments of the invention.

What is claimed is:

1. An electronic system, comprising:
   a first set of circuit boards;
   a second set of circuit boards; and
   a backplane interconnect system including a first backplane interconnect configured to carry first electrical backplane signals among the first set of circuit boards, a second backplane interconnect configured to carry second electrical backplane signals among the second set of circuit boards, and a backplane coupling assembly having:
      a first switch attached to the first backplane interconnect, the first switch being configured to convey at least some of the first electrical backplane signals between circuit boards of the first set of circuit boards,
      a second switch attached to the second backplane interconnect, the second switch being configured to convey at least some of the second electrical backplane signals between circuit boards of the second set of circuit boards, and
      a fiber optic cable joining the first and second switches together, the first and second switches being configured to exchange fiber optic signals through the fiber optic cable to operate as a cohesive backplane interconnect system between the first and second sets of circuit boards.

2. The electronic system of claim 1 wherein the first switch includes (i) an electrical connector configured to engage a backplane connector of the first backplane interconnect and (ii) an optical interface, wherein the second switch includes (i) an electrical connector configured to engage a backplane connector of the second backplane interconnect and (ii) an optical interface, and wherein the fiber optic cable connects the optical interface of the first switch to the optical interface of the second switch.

3. The electronic system of claim 2 wherein the first switch further includes first switching circuitry configured to operate under a Dense Parallel Optics communications protocol, wherein the second switch further includes second switching circuitry configured to operate under the Dense Parallel Optics communications protocol, and wherein the fiber optic cable is configured to carry signals in accordance with the Dense Parallel Optics communications protocol between the first and second switching circuitry.

4. The electronic system of claim 1 wherein the first switch is a multi-port switch having at least four ports coupled to respective circuit boards of the first set of circuit boards, at least four more ports coupled to other switches attached to the first backplane interconnect, and at least two ports coupled to the fiber optic cable; and wherein the second switch is another multi-port switch having at least four ports coupled to respective circuit boards of the second set of circuit boards, at least four more ports coupled to other switches attached to the second backplane interconnect, and at least two ports coupled to the fiber optic cable.

5. The electronic system of claim 1 wherein the first and second sets of circuit boards are configured to operate together as a consolidated data storage system that performs data storage operations on behalf of a set of external hosts.

6. The electronic system of claim 5 wherein the first switch further includes first switching circuitry, wherein the second switch further includes second switching circuitry, and wherein the first and second switching circuitry is configured to exchange packet-based data storage signals through the fiber optic cable.

7. The electronic system of claim 5, further comprising:
   a first card cage assembly which is configured to (i) mount to a standard rack mount frame, (ii) support the first backplane interconnect, and (iii) provide substantially parallel slots for aligning the first set of circuit boards with the first backplane interconnect; and
   a second card cage assembly which is configured to (i) mount to the standard rack mount frame, (ii) support the second backplane interconnect, and (iii) provide substantially parallel slots for aligning the second set of circuit boards with the second backplane interconnect, the backplane coupling assembly being configured to extend from the first card cage assembly to the second card cage assembly to provide communications therebetween.

8. The electronic system of claim 5, further comprising:
   a first enclosure which is configured to house the first backplane interconnect and the first set of circuit boards; and
   a second enclosure which is configured to house the second backplane interconnect and the second set of circuit boards, the backplane coupling assembly being configured to extend from the first enclosure to the second enclosure to provide communications therebetween.

9. The electronic system of claim 5 wherein the first switch further includes first switch-based communications processing circuitry within a single, optically-enabled integrated circuit package disposed at a first end of the fiber optic cable, and wherein the second switch further includes second switch-based communications processing circuitry within another single, optically-enabled integrated circuit package disposed at a second end of the fiber optic cable.

10. The electronic system of claim 5 wherein the first switch further includes first switch-based communications processing circuitry disposed on a card configured to attach to the first backplane interconnect, and wherein the second switch further includes second switch-based communications processing circuitry disposed on another card configured to attach to the second backplane interconnect.

11. A backplane interconnect system, comprising:
   a first backplane interconnect configured to carry first electrical backplane signals among a first set of circuit boards;
   a second backplane interconnect configured to carry second electrical backplane signals among a second set of circuit boards; and
   a backplane coupling assembly having:
      a first switch attached to the first backplane interconnect, the first switch being configured to convey at least some of the first electrical backplane signals between circuit boards of the first set of circuit boards, a second switch attached to the second backplane interconnect, the second switch being configured to convey at least some of the second electrical backplane signals between circuit boards of the second set of circuit boards, and a fiber optic cable joining the first and second switches together, the first and second switches being configured to exchange fiber optic signals through the fiber optic cable to operate as a cohesive backplane interconnect system between the first and second sets of circuit boards.

12. A backplane coupling assembly for coupling a first backplane interconnect to a second backplane interconnect, the first backplane interconnect being configured to carry first electrical backplane signals among a first set of circuit boards, the second backplane interconnect being configured to carry second electrical backplane signals among a second set of circuit boards, the backplane coupling assembly comprising:

a first switch which, when the backplane coupling assembly is attached to the first and second backplane interconnects, is configured to convey at least some of the first electrical backplane signals between circuit boards of the first set of circuit boards;

a second switch which, when the backplane coupling assembly is attached to the first and second backplane interconnects, is configured to convey at least some of the second electrical backplane signals between circuit boards of the second set of circuit boards; and a fiber optic cable joining the first and second switches together, the first and second switches being configured to exchange fiber optic signals through the fiber optic cable to form a cohesive backplane interconnect system between the first and second sets of circuit boards when the backplane coupling assembly is attached to the first and second backplane interconnects.

13. The backplane coupling assembly of claim 12 wherein the first switch includes (i) an electrical connector configured to engage a backplane connector of the first backplane interconnect and (ii) an optical interface, wherein the second switch includes (i) an electrical connector configured to engage a backplane connector of the second backplane interconnect and (ii) an optical interface, and wherein the fiber optic cable connects the optical interface of the first switch to the optical interface of the second switch.

14. The backplane coupling assembly of claim 13 wherein the first switch further includes first switching circuitry configured to operate under a Dense Parallel Optics communications protocol, wherein the second switch further includes second switching circuitry configured to operate under the Dense Parallel Optics communications protocol, and wherein the fiber optic cable is configured to carry signals in accordance with the Dense Parallel Optics communications protocol between the first and second switching circuitry.

15. The backplane coupling assembly of claim 13 wherein the first switch further includes first switching circuitry, wherein the second switch further includes second switching circuitry, and wherein the first and second switching circuitry is configured to exchange packet-based data storage signals through the fiber optic cable.

16. A backplane coupling assembly for coupling a first backplane interconnect to a second backplane interconnect, the first backplane interconnect being configured to carry first electrical backplane signals among a first set of circuit boards, the second backplane interconnect being configured to carry second electrical backplane signals among a second set of circuit boards, the backplane coupling assembly comprising:

a first switch which, when the backplane coupling assembly is attached to the first and second backplane interconnects, is configured to convey at least some of the first electrical backplane signals between circuit boards of the first set of circuit boards;

a second switch which, when the backplane coupling assembly is attached to the first and second backplane interconnects, is configured to convey at least some of the second electrical backplane signals between circuit boards of the second set of circuit boards; and means for exchanging fiber optic signals between the first and second switches to form a cohesive backplane interconnect system between the first and second sets of circuit boards when the backplane coupling assembly is attached to the first and second backplane interconnects.

* * * * *